United States Patent Office 2,697,278
Patented Dec. 21, 1954

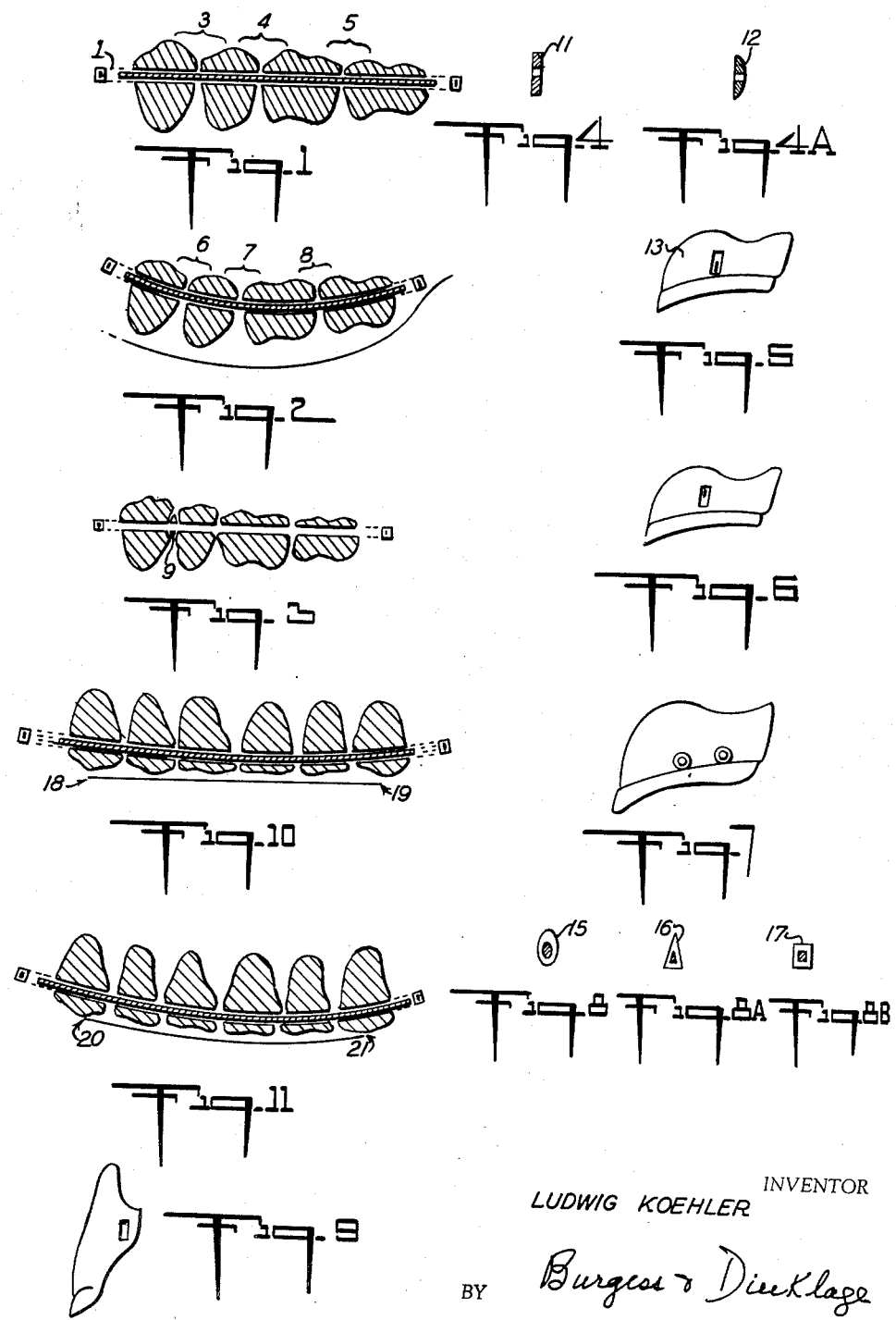

2,697,278

ARTIFICIAL TEETH

Ludwig Köhler, Steeg, near Bacharach (Rhine), Germany, assignor to Fred L. Koehler, New York, N. Y.

Application November 28, 1950, Serial No. 198,006

Claims priority, application Germany December 5, 1949

18 Claims. (Cl. 32—11)

This invention relates to artificial teeth. It relates particularly to artificial tooth blocks comprising a number of teeth joined together in a form suitable for incorporation in dentures.

According to approved dental practice, artificial teeth are incorporated in dentures in the following manner. An impression of the patient's upper and lower jaw is first taken. From these impressions molds of the upper and lower jaws are produced. At the place where the teeth are missing in the mold a base plate is formed. Wax is then built up over this base plate, and the base plate with the wax is placed in the patient's mouth. The patient then closes his jaw and the wax is molded by means of a hot spatula, a bite pattern is thus formed. The bite pattern is then placed back in the mold and the mold placed on an articulator and the exact positioning of the jaws is obtained. The wax is then removed and a strong base plate is built up on the mold. On this base plate the artificial teeth are fastened with wax. After the teeth are positioned in the proper relation in respect to all the planes, the wax is melted and plastic or another form is used to replace the wax.

Very early in dentistry the advantages of having several teeth joined together in forming a denture where several adjacent teeth were missing became evident. Attempts were made to wax the teeth together in blocks. This was not successful due to the lack of mobility of the individual teeth on the blocks. It was also suggested to attach teeth together by flexible plastic joint means. This did not prove advantageous because the teeth had to be permanently joined together in the block and since when fitting the teeth different colors etc. had to be used it involved having available a large number of these blocks. Also the desired mobility of the individual teeth was not obtained and replacement of individual teeth was impossible.

One object of this invention is a new artificial tooth block allowing mobility of the individual teeth elements, easy exchangeability of the individual teeth elements and easy construction of the tooth block. This and other objects will become apparent from the following description read in conjunction with the drawings in which:

Figure 1 shows diagrammatically in section a group of 4 lower molars incorporated in a tooth block in accordance with the invention.

Figure 2 shows the tooth block shown in Figure 1, with a curvature corresponding to the jaw curvature.

Figure 3 shows a tooth block diagrammatically in section in accordance with the invention with a shim between 2 of the molars.

Figures 4 and 4A show in section different forms of the shims that may be used in accordance with the invention.

Figure 5 shows a side elevation of a tooth used in the tooth block with a rectangular canal.

Figure 6 shows the tooth in Figure 5 at its deepest position.

Figure 7 shows a side elevation of a tooth used in the new tooth block having 2 round channels with a flexible guidance in said channel.

Figures 8, 8A and 8B show various cross sections of the channels and flexible guide means that may be used in accordance with the invention.

Figure 9 shows a front tooth used in a tooth block in accordance with the invention, having a square channel.

Figure 10 shows diagrammatically in section an upper front tooth block in accordance with the invention.

Figure 11 shows diagrammatically in section the tooth block shown in Figure 10 in a curved position.

In accordance with the invention the tooth blocks are formed of artificial teeth which are perforated by 2 or more canals of any transverse section in line with the tooth line. Through these canals a flexible guidance is placed to hold the teeth in the form of the block. Instead of the two canals, a single canal may be used providing that the canal and the flexible guidance are of such a cross section as to prevent rotation of the individual teeth on the guidance. This canal may also be of such a cross section, and the flexible guidance of a corresponding cross section, to allow only limited rotation of the individual teeth on the tooth block.

If the cross section of the canals and the corresponding cross section of the flexible guidance is of any cross section other than circular, rotation may be prevented, or a limited rotation may be had. The section, for example, may be in the form of a vertical rectangle and the guidance may also be of rectangular cross section. If, however, the rectangle of the canal is larger than the cross section of the flexible guidance lengthwise, and almost the same length across, the individual artificial tooth may be raised or lowered in the guidance but not rotated.

The individual tooth in the new tooth blocks may have concave or convex points of contact. Thus, if two teeth, one having convex point of contact, the other having a concave point of contact are adjacent, the teeth will fit together, lateral displacement will be prevented and yet the flexibility desired for putting the occlusal surface in the required position is retained. The concave and convex surfaces may be so formed that they run lengthwise upwards and downwards in the line of the tooth axis. Thus, the individual teeth may be moved up or down, but cannot be displaced buccally or lingually.

If it is desired to increase the distance between the individual teeth in the new tooth blocks, perforated shims may be placed between the individual teeth. These shims may be plane, concave or convex and may be made out of the same material as the teeth are.

With reference to Figures 1 and 2, a group of 4 lower molars is shown in a flexible guidance 1. The flexible guidance has a rectangular cross section, and the canals through the teeth have a corresponding rectangular cross section. The arcs 3, 4 and 5 show the distance between the cusps of the individual teeth. In Figure 2 the tooth block is shown in a curved position corresponding to the curvature of the lower jaw. As a result of setting the teeth in line with this curvature, the distance between the cusps as shown by the arcs 6, 7 and 8, is diminished. By shortening the distance between the cusps thus, the distances may not correspond to the distances needed. It will thus become necessary to increase the distances between the individual teeth and thus increase the distances between the cusps. To increase this distance in the new tooth blocks requires a very simple operation, as shown in Figure 3, where the individual teeth have a concave surface at the points of contacts and a convex shim 9 may be strung on the flexible guidance and placed in between the teeth and thus increase the distance between the individual teeth and subsequently increase the distance between the cusps. This shim should have a canal with a cross section corresponding to the cross section of the flexible guidance. The shims may be of any desired shape, such as having a square side cross section as shown by 11 in Figure 4, or a plano convex cross section as shown by 12 in Figure 4A. The cross sections show the canal throughout the center of the shims.

If it is desirable to raise or lower the individual teeth in the tooth blocks, the canal may have a rectangular cross section as shown in Figures 5 and 6. This rectangular cross section 13 is constructed to be longer than the corresponding flexible guidance cross section shown as the black portion in the canal 13. In Figure 5, the tooth is at its highest position in the flexible guidance, while in Figure 6 the tooth is in its lowest position on the flexible guidance. It will be noted that the width of the flexible guidance corresponds to the width of the canal and thus rotation is prevented. If canals and guidances of a round cross section are used, two canals must be drilled through each individual tooth on the tooth block and they must be strung on two flexible guidances as shown in Figure 7. Figs. 8, 8A and 8B show various cross sections that may be employed if a single canal and flexible guidance is used. The canal is shown by the outline and the flexible guidance is shown by the dark portion. Figure 15 shows an oval cross section of the canal and guidance which will allow limited rotation and movement of the individual tooth up and down. 16 shows a triangular cross section, and 17 shows a rectangular cross section, which will allow the same movements of the individual teeth.

Figure 9 shows a front tooth used as a tooth element on a tooth block with a canal having a rectangular cross section for the passage of the flexible guidance therethrough. Figures 10 and 11 show 2 types of upper front tooth blocks which are perforated by canals and joined in the form of a tooth block. In Figure 10 the incisors are set with the cusps as shown by the lines 18 to 19. In Figure 11 the teeth are set so that the cusps follow the form of the curved line 20 to 21.

In accordance with the invention, the new teeth may be manufactured out of material that artificial teeth are normally manufactured from, such as porcelain, metal or plastics such as methyl-acrylate polymers. The shims may be constructed of the same material. The flexible guidance may be in the form of wire or small bands of different materials, as, for example, tin, copper, aluminum, soft iron fibers, plastic or combinations. The physical properties of the flexible guidance are important—that is, the flexibility is of importance, but the chemical resistance of the material need not be considered, as the guidance is absolutely enclosed in the finished denture and therefore prevented from any chemical attack.

It can thus be seen that the new tooth blocks may be adapted to any curvature or form of the jaws. This is important, as after tooth loss the jaws change in their form. The relative position of the jaw ridges to each other also changes after tooth loss. It can readily be seen that these new flexible tooth blocks may be adapted to any of the jaw changes. In accordance with the invention, it can be seen that it is also possible to change the inclination of the occlusal surface for each individual tooth in the tooth block and yet maintain the fundamental form of the tooth block. Since the individual tooth may be strung on the flexible guidance, the tooth block may be simply made up as to variations in color etc. This as can be readily seen will facilitate storage and stock problems with the individual dentist and the factories. It can also be readily seen that the individual tooth on the tooth blocks may be changed, which convenience can readily be seen without further statement. Also the tooth blocks may be made up by the dentist and need not be manufactured in the tooth block form by the factories. Thus the dentist can take the individual tooth having the canals therethrough and the individual flexible guidances and string his own tooth blocks to fit the individual needs of his practice.

I claim:

1. An artificial tooth useful as a tooth element in a tooth block, having at least two canals therethrough, said canals being positioned in the direction of tooth line for the passage of a flexible guidance therethrough, and having at least one portion thereon for contact with another tooth in a tooth block, said portion being defined by a concave surface.

2. An artificial tooth useful as a tooth element in a tooth block, having at least one canal therethrough, said canal being positioned in the direction of the tooth line for the passage of a flexible guidance therethrough, said canal being of a non-circular cross section, said tooth having at least one portion thereof for contact with another tooth in a tooth block, said portion being defined by a concave surface.

3. An artificial tooth in accordance with claim 2, having at least one portion thereon for contact with another tooth in a tooth block, said portion being defined by a convex surface.

4. An artificial tooth in accordance with claim 2, in which said canal is of greater height than width.

5. An artificial tooth in accordance with claim 4, in which said canal is a canal of rectangular cross section.

6. A tooth block suitable for incorporation in a denture, comprising a number of artificial teeth, said teeth each having at least 2 canals therethrough, said canals being in the direction of the tooth line, said teeth being joined together by at least 2 flexible guidances passing through said canals.

7. A tooth block consisting of a number of artificial teeth each having a canal therethrough, said canal being positioned in the direction of the tooth line, said canal being of a non-circular cross section, a flexible guidance passing through said canals, said flexible guidance being of a non-circular cross section at least one tooth in said tooth block having a concave portion adjacent another tooth in said block.

8. A tooth block according to claim 7 in which said canals are of a cross section of greater length than width, said flexible guidance having a cross section of lesser length than said canal cross section, whereby each individual tooth may be displaced up or down but will not rotate.

9. A tooth block in accordance with claim 8 in which said canal cross section is a rectangular cross section and said flexible guidance cross section is a rectangular cross section of lesser length than said canal cross section.

10. A perforated shim for use in separating the individual teeth in a tooth block of the class described, comprising a convex shim body portion with a canal therethrough for the passage of a flexible guidance.

11. A tooth block according to claim 6, in which at least one tooth of said block has a concave portion adjacent another tooth of said block.

12. Tooth block according to claim 11, in which the tooth adjacent said tooth with the concave portion has a mating convex portion.

13. Tooth block according to claim 6, including at least one perforated shim positioned between two adjacent teeth of the tooth block, spacing said teeth and having said flexible guidances passing therethrough.

14. Tooth block according to claim 13, in which said perforated shim has a convex shim body and in which the teeth adjacent thereto have mating concave portions.

15. Tooth block according to claim 7, in which the tooth immediately adjacent the tooth block having the concave portion has a mating convex portion.

16. Tooth block according to claim 7, including at least one perforated shim positioned between two teeth of the tooth block for the spacing thereof with said flexible guidance passing through the shim body.

17. Tooth block according to claim 16, in which said perforated shim has a convex shim body and is positioned adjacent said concave portion and mates therewith.

18. A tooth block suitable for incorporation in a denture, comprising a number of artificial teeth, said teeth each having a canal of rectangular cross-section therethrough, said canals being in the direction of the tooth line, said teeth being joined together by a flexible guidance passing through said canals and having a cross-section dimensioned to prevent rotation and allow displacement up and down of the individual teeth.

References Cited in the file of this patent

UNITED STATES PATENTS

| Number | Name | Date |
|---|---|---|
| 374,572 | Beale, Jr. | Dec. 13, 1887 |
| 1,014,348 | Todd | Jan. 9, 1912 |
| 1,070,442 | Fogg | Aug. 19, 1913 |
| 1,347,443 | Christiani | July 20, 1920 |
| 1,461,305 | Brookes et al. | July 10, 1923 |
| 1,507,024 | Monson | Sept. 2, 1924 |
| 1,743,809 | Derby | Jan. 14, 1930 |
| 2,350,196 | Saffir | May 30, 1944 |